US010026228B2

(12) United States Patent
Yuen et al.

(10) Patent No.: US 10,026,228 B2
(45) Date of Patent: Jul. 17, 2018

(54) SCENE MODIFICATION FOR AUGMENTED REALITY USING MARKERS WITH PARAMETERS

(71) Applicants: Kathy Yuen, Portland, OR (US); Glen J. Anderson, Beaverton, OR (US)

(72) Inventors: Kathy Yuen, Portland, OR (US); Glen J. Anderson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 65 days.

(21) Appl. No.: 14/631,332

(22) Filed: Feb. 25, 2015

(65) Prior Publication Data

US 2016/0247320 A1 Aug. 25, 2016

(51) Int. Cl.
*G06T 19/00* (2011.01)
*G06T 17/10* (2006.01)
*G11B 27/00* (2006.01)
*G06T 19/20* (2011.01)

(52) U.S. Cl.
CPC ............ *G06T 19/006* (2013.01); *G06T 17/10* (2013.01); *G06T 19/20* (2013.01); *G11B 27/00* (2013.01); *G06T 2219/2012* (2013.01); *G06T 2219/2016* (2013.01); *G06T 2219/2021* (2013.01)

(58) Field of Classification Search
CPC .................................................... G06T 19/006
See application file for complete search history.

(56) References Cited

U.S. PATENT DOCUMENTS

| 8,267,793 | B2* | 9/2012 | Engolz .................... A63F 13/12 345/158 |
| 8,434,674 | B2 | 5/2013 | Mangione-Smith |
| 9,366,765 | B2* | 6/2016 | France .................... G01S 19/51 |
| 9,552,674 | B1* | 1/2017 | Jayadevaprakash .. G06T 19/006 |
| 2008/0247663 | A1* | 10/2008 | Jacobsen ........... G06F 17/30805 382/266 |
| 2009/0109240 | A1* | 4/2009 | Englert ................. G06T 19/006 345/633 |
| 2009/0251421 | A1* | 10/2009 | Bloebaum ............... G06F 3/016 345/173 |
| 2010/0045869 | A1* | 2/2010 | Baseley ................ G06T 7/0042 348/598 |

(Continued)

FOREIGN PATENT DOCUMENTS

KR  2014/0108128  9/2014

OTHER PUBLICATIONS

PCT International Search Report and Written Opinion of the International Searching Authority for International Application No. PCT/US2016/013378, dated May 2, 2016, 15 pages.

*Primary Examiner* — Kee M Tung
*Assistant Examiner* — Grace Q Li
(74) *Attorney, Agent, or Firm* — Womble Bond Dickinson (US) LLP

(57) ABSTRACT

Scene modification is described for augmented reality using markers with parameters. In one example, a method includes capturing a scene by a camera, the scene having a marker, analyzing the captured scene to identify the marker, determining a location of the marker in the captured scene, determining an augmented reality parameter associated with the identified marker, modifying the captured scene at the marker location based on the augmented reality parameter, and rendering the modified scene.

17 Claims, 12 Drawing Sheets

(56) References Cited

U.S. PATENT DOCUMENTS

| | | | |
|---|---|---|---|
| 2010/0203933 A1* | 8/2010 | Eyzaguirre | A63H 13/10 463/2 |
| 2011/0063295 A1 | 3/2011 | Kuo et al. | |
| 2011/0221771 A1* | 9/2011 | Cramer | G06Q 30/02 345/633 |
| 2012/0113228 A1* | 5/2012 | Konno | H04N 13/0239 348/47 |
| 2013/0155106 A1 | 6/2013 | Rolleston et al. | |
| 2013/0328863 A1* | 12/2013 | Pirwani | G06T 15/00 345/419 |
| 2014/0002677 A1* | 1/2014 | Schinker | H04N 5/232 348/207.1 |
| 2014/0002793 A1* | 1/2014 | Hogan | A61B 3/0025 351/206 |
| 2014/0129990 A1* | 5/2014 | Xin | G06F 3/017 715/849 |
| 2014/0171039 A1* | 6/2014 | Bjontegard | H04L 29/06034 455/414.1 |
| 2014/0176608 A1 | 6/2014 | Boysen et al. | |
| 2014/0188669 A1* | 7/2014 | Freeman | G06Q 30/0643 705/27.2 |
| 2014/0275760 A1* | 9/2014 | Lee | A61B 1/00045 600/102 |
| 2014/0378023 A1 | 12/2014 | Muthyala et al. | |
| 2015/0206349 A1* | 7/2015 | Rosenthal | H04N 21/41407 345/633 |
| 2015/0235425 A1* | 8/2015 | Koga | G06T 19/006 345/633 |

\* cited by examiner

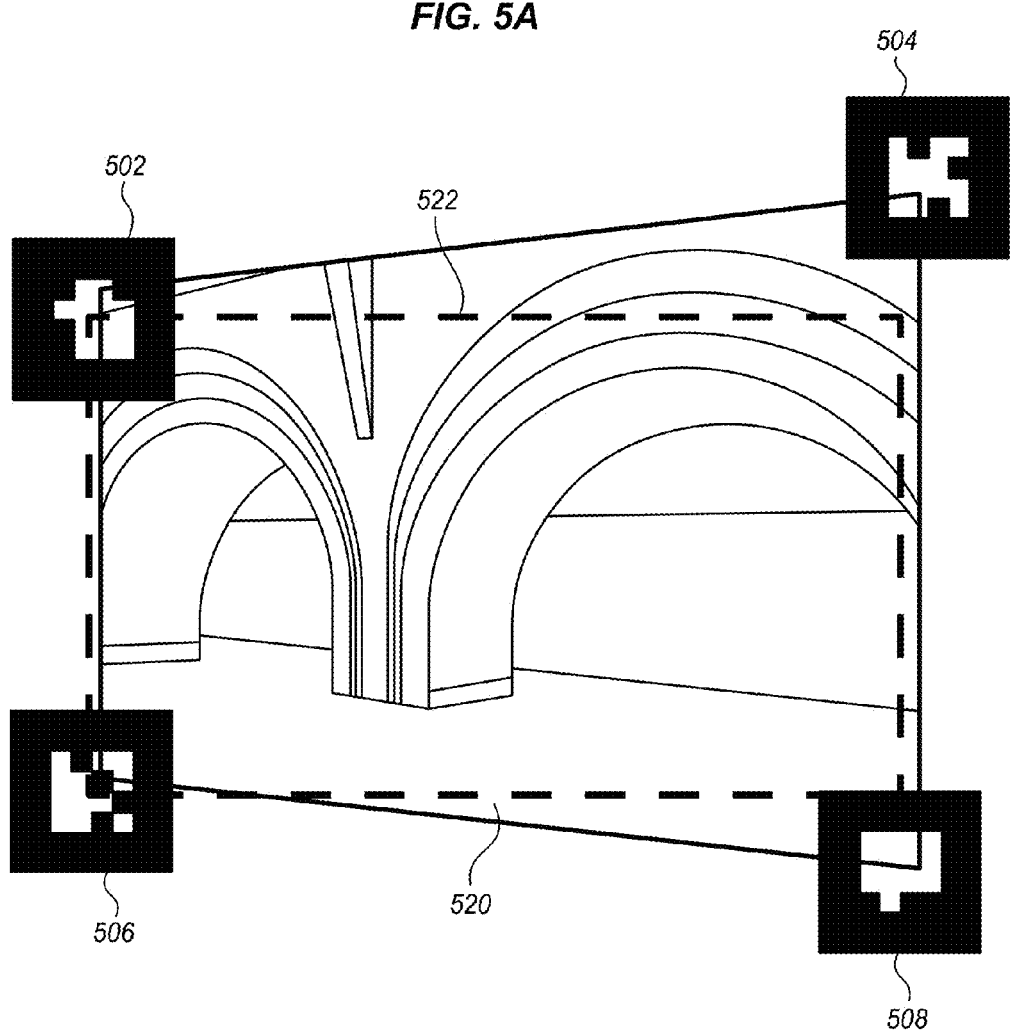

SCENE MODIFICATION FOR AUGMENTED REALITY USING MARKERS WITH PARAMETERS

FIELD

The present description relates to augmented reality using markers and, in particular, to using markers that are associated with parameters.

BACKGROUND

Augmented reality (AR) systems are developed to use fiducial markers. A marker is placed in a real scene for use as a reference point for augmented effects. The marker may mark the location of a virtual object or character to be added to the real scene. A marker may also be used to identify a stationary or moving object for reference or measurement purposes. As a reference, the marker may be used to scale an AR image according to the depth and perspective of a camera directed at the real scene. Multiple AR markers are used in a related set of real scenes to align the scenes and scale them to each other.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5A is a diagram of the imaged scene of FIG. 2 after modification using the corner markers according to an embodiment.

DETAILED DESCRIPTION

Fiducial markers may be provided with characteristics that can be used in an augmented reality system. The characteristics may be dimensional, relational, or a property of an article at or near the marker. For example, marker characteristics may include one or more of distance, size, topographical position, texture, or any other suitable feature. When such a fiducial marker is observed in a scene, then the characteristics may be provided to a rendering system so that the characteristics of the marker are included in the rendering. Such fiducial markers may be placed in a real scene before the scene is captured to affect the rendering of the real scene. Such fiducial markers may be combined with physical markers to provide more opportunities to modify the scene.

Figure 1:
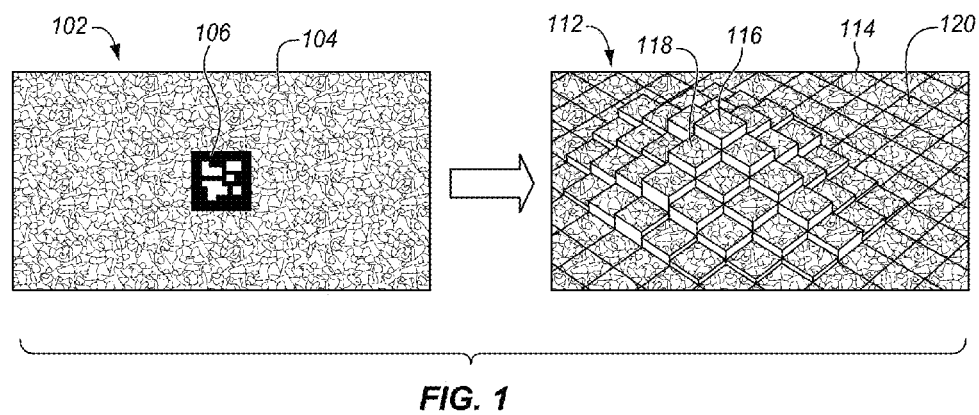
FIG. 1 is a diagram of a scene with a marker showing the application of an elevation parameter associated with the marker according to an embodiment.

FIG. 1 is a diagram of a scene with a marker to show the application of AR techniques using the marker. It provides an example of using a fiducial marker with a parameter to enable users to easily create elaborate AR scenes and videos. The fiducial markers may be combined with other physical elements of the scene and with virtual elements that may be added. As shown in FIG. 1, the scene 102 has a relatively uniform 2D image 104 and includes a fiducial marker 106 that has a parameter. The 2D image may be a photograph, a computer generated surface or any other type of image. In one example, the image is printed and laid out on a table or other convenient surface. Alternatively, the fiducial marker may be printed or made in any other desired fashion and then placed on a real scene or on a separate image of a scene.

The fiducial marker is placed on the image in any desired location. In the illustrated example the marker is placed in the center of the image. The marker may be placed in another position and multiple markers may be used, depending on the user's decisions. In this example, the parameter associated with the marker is an elevation or height. The use of the marker indicates a desire to have a 3D landscape appear in an AR view. Such a desire may be expressly indicated by the user or implied from the circumstance of a particular marker being placed on a particular type of surface e.g. a flat surface. The left side image 104 shows the real scene with the landscape and the single marker.

The AR system captures the landscape or scene 102, observes the relative position of the marker 106 on the surface 104 and then applies the parameter or parameters associated with the fiducial marker to generate an AR view 112 of the surface. The image 112 on the right is an AR view of the same surface 114 as on the left with a hill of a certain relative maximum height 116. The hill has a slope provided by neighboring raised portions 118 surrounding the peak 116. These raised portions are all elevated over the original flat plain 120 which is in the plane of the original 2D image 104. The parameters associated with the fiducial marker may include the height, the slope, and various other size parameters. As shown, the 2D image is broken into square tiles to generate the AR view. The tile corresponding to the position 116 of the marker 106 is elevated the most corresponding to the height parameter for the marker. The surrounding tiles are elevated to produce the slope. The sizes of the tiles may be associated with the marker as a parameter of the marker or with some other aspect of the AR system.

The principle of the single marker with elevation may be applied to a variety of different 2D images. For 3D images the marker may indicate an elevation that is to be applied to change a current elevation if the starting 3D image already has an elevation. Multiple markers may be used in the same way to apply multiple different elevations to different positions on the original image 104. See e.g. FIG. 8. The aggregated use of multiple fiducial markers may be used to enable many other ways to create interesting AR experiences.

The use of physical markers as shown in FIG. 1 may be used to manipulate other aspects of the image such as perspective, contours, topography, texture, color, visual effects, such as sepia or brightness, or other attributes of the scene. Physical markers may also correspond to mood effects, which in turn correspond to visual effects, for example darkness and partial color shifting representing a "scary" effect. The background itself may also be invoked by a fiducial marker. In other words, a fiducial marker may be used on a foreground subject with no background and the fiducial marker may identify a background to be applied to the foreground in AR.

In another example of using fiducial marker with parameters a fixed camera perspective may be used with multiple fiducial markers that are aggregated to create an AR experience. As described below, aggregated fiducial markers may be used for 2D digital image manipulation.

Figure 2:
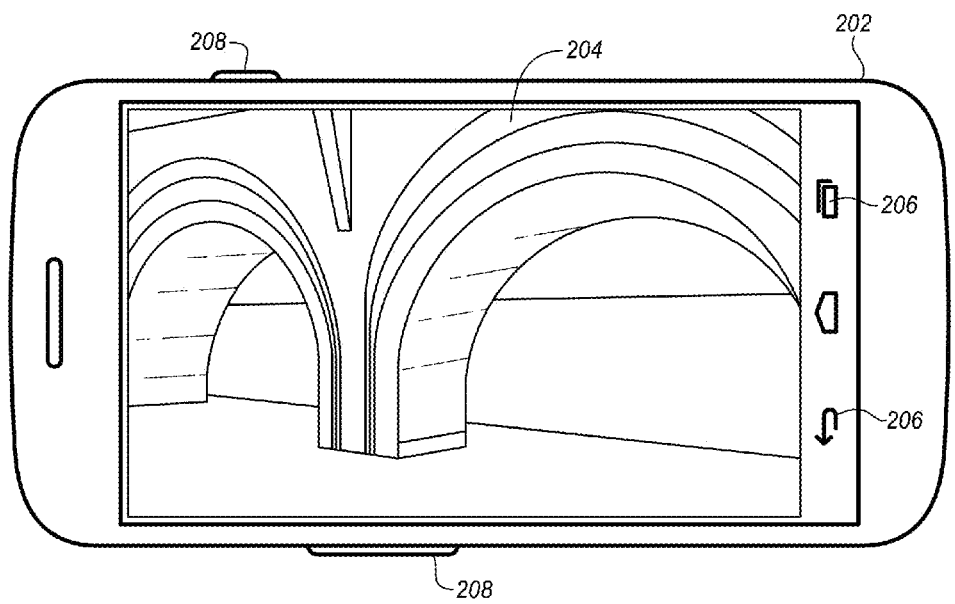
FIG. 2 is a top elevation view of an image processing device showing an imaged scene.

FIG. 2 is a top elevation view of an image processing device 202, such as a smartphone, a tablet, or a smart camera. The apparatus and methods described herein may also be applied to a computer, workstation, video editing system or other computing device. The device 202 has a screen 204 to display an image which may be captured by a camera on the device (typically on the opposite side of the device, not shown), retrieved from memory or received from a remote source. The device also has capacitive switches 206 and physical switches 208 to receive user inputs. The device may also have microphones, speakers, wireless interfaces and any of a variety of other structures and systems to perform any additional functions of the device. In addition, the device may have a capacitive touch surface over the image display 204 for additional user input. Alternatively, trackballs, joysticks, jog wheels, pen surfaces or a mouse may be coupled to the device to receive user inputs.

Manipulations of the displayed image may be tracked through the position and orientation of various markers on the image. The image may be automatically scaled and cropped to the resolution of a display or to the resolution of a camera for video and image capture.

Figure 3:
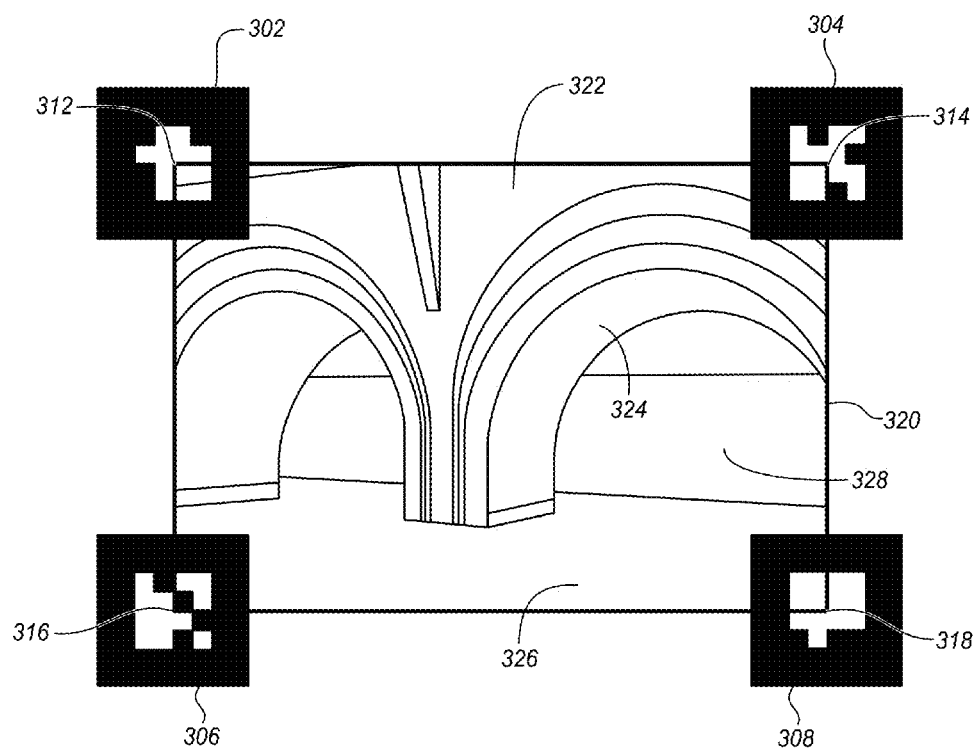
FIG. 3 is a diagram of the imaged scene of FIG. 2 showing corner markers according to an embodiment.

FIG. 3 is a diagram of the image shown in FIG. 2 with superimposed markers. Physical markers 302, 304, 306, 308 are used as transformation points on a pre-selected digital image 320. As in all other examples herein, the image may be from a local camera, from storage, or from a remote source. Each marker references a specific one of the four corners 312, 314, 316, 318, of the user-defined or selected image.

As in the example of FIG. 1, the scene 322 may be a real scene or an image. The fiducial markers may be associated with the corners of the image in different ways. In one example, the markers are configured or selected by a user, printed, and then attached to a real scene, that is on the wall and floors of the hall. In another example, the markers are configured or selected by the user and then associated with a position on the image. In this case, the markers are virtual markers or images of markers that are placed on a stored image or on an image of the real scene presented to the user. The markers may be placed by touching a position on a touchscreen or using a stylus, mouse, or other pointing device to indicate a position for each marker.

As shown, each marker has a different black and white pixel pattern which may be used as an identification number for a particular marker. A camera capturing the scene with these applied markers may use the pixel patterns to distinguish each of the markers from each other. Each identified marker may then be associated with particular parameters such as the top left corner, or the top right corner of the image. In the illustrated example, the image features an archway 324 on a smooth flat floor 326 of e.g. a railway station or large hall. The archway is in front of a rear wall 328 at the far end of the hall. The image is captured or presented at an angle to the rear wall and the archway so that the archway and the rear wall are closer on the right side of the image than on the left side of the image.

Figure 4:
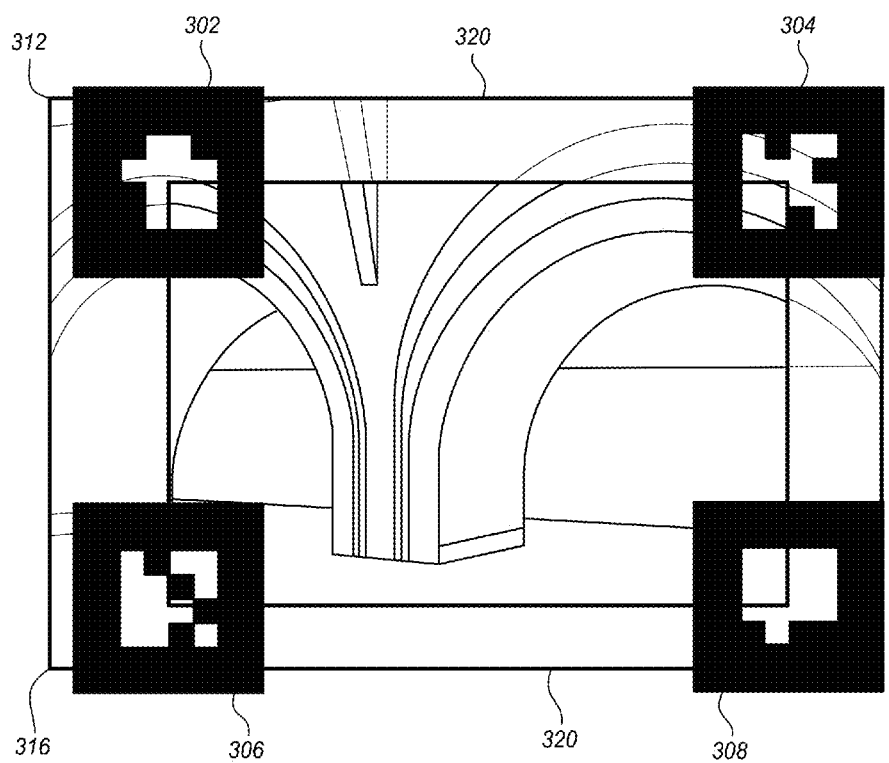
FIG. 4 is a diagram of the imaged scene of FIG. 2 showing corner markers in a different location according to an embodiment.

FIG. 4 is a diagram of the image of FIG. 3 in which the markers 302, 304, 306, 308 are moved away from the corners 312, 314, 316, 318 of the image 320. In software, each reference point of the image as indicated by the respective marker is re-assigned to the center of the corresponding marker. This allows a user to crop the image using the physical markers as a reference point.

FIG. 5A is a diagram of the same image after having been modified using the physical markers. In this example, the physical markers 502, 504, 506, 508 remain at the corners of the image. However, the position of these markers relative to the AR view may be moved. The markers in this case serve as a handle for grabbing the image. Using a fixed camera position, the user may distort and manipulate the image by changing the positions of the markers. Because each marker has attributes of ID and orientation, the image can even be mirrored.

In the example of FIG. 5A, the right side markers 504, 509 are pulled toward the viewer and the left side markers 502, 506 are pushed away from the viewer. One side or both sides may be moved to create a relative difference in distance from the viewer. This manipulation accentuates the image view in which the right side objects are closer to the viewer than the left side objects. The image is no longer rectangular as in FIG. 2 because of the manipulation. The image may be used in the angled format or it may be cropped to a rectangular shape. A guide line 522, shown here as a dotted line, may be provided to show the boundaries of the largest possible rectangular crop of the angled image. The guide line may be used to allow the user to change the size of the crop or to move the image relative to the guide line using the corner markers.

Figure 5B:
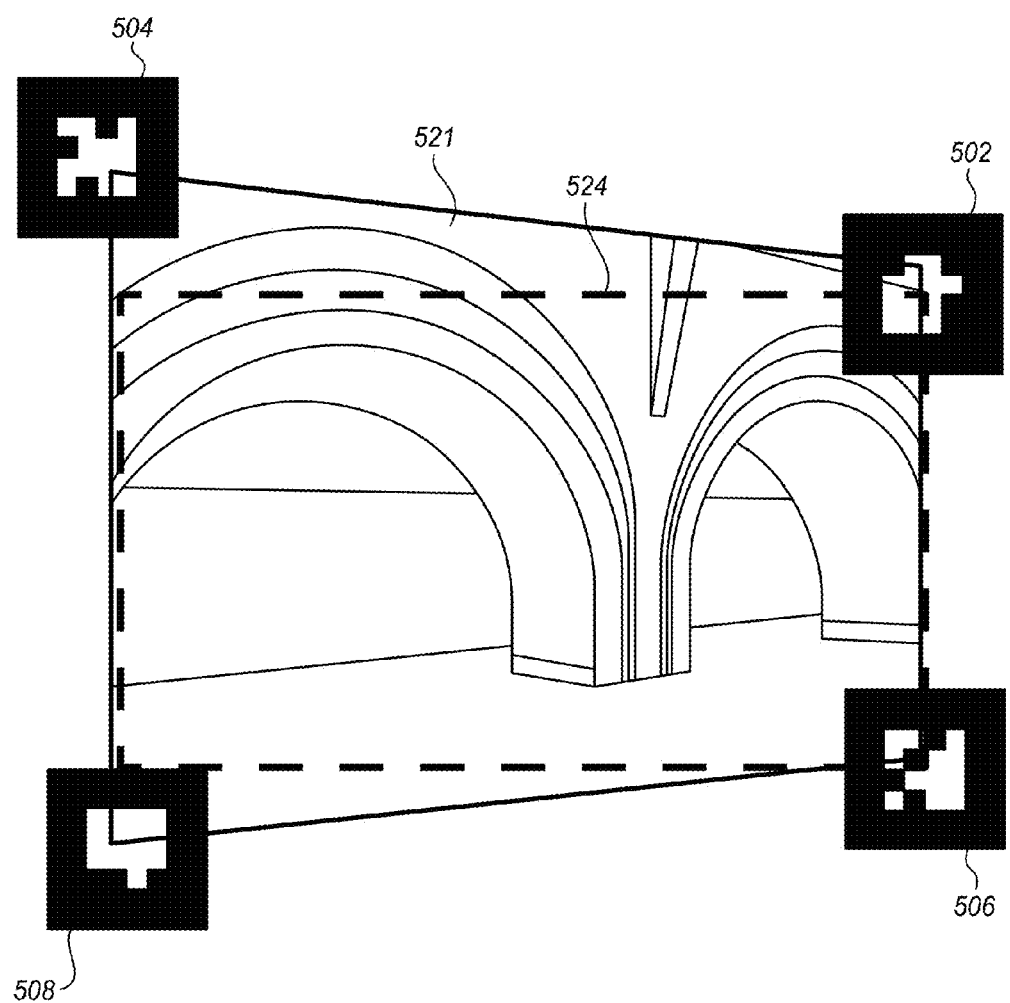
FIG. 5B is a diagram of the imaged scene of FIG. 2 after an alternative modification using the corner markers according to an embodiment.

FIG. 5B is a diagram of a mirror image 521 of the image of FIG. 4. The corner markers on the left 502, 506 have been moved to the right and the corner markers on the right 504, 508 have been moved to the left. The image is now reversed from the image of FIG. 5A and a similar guide line 524 may be used to determine how to crop the image. This reversal may be indicated by continuing to pull or push on the markers until the image rotates around to position as indicated. The markers may be used for many other modifications. Because the markers each include a parameter identifying particular corner or other location of the image, the markers may be moved to different positions without losing that information.

Figure 6:
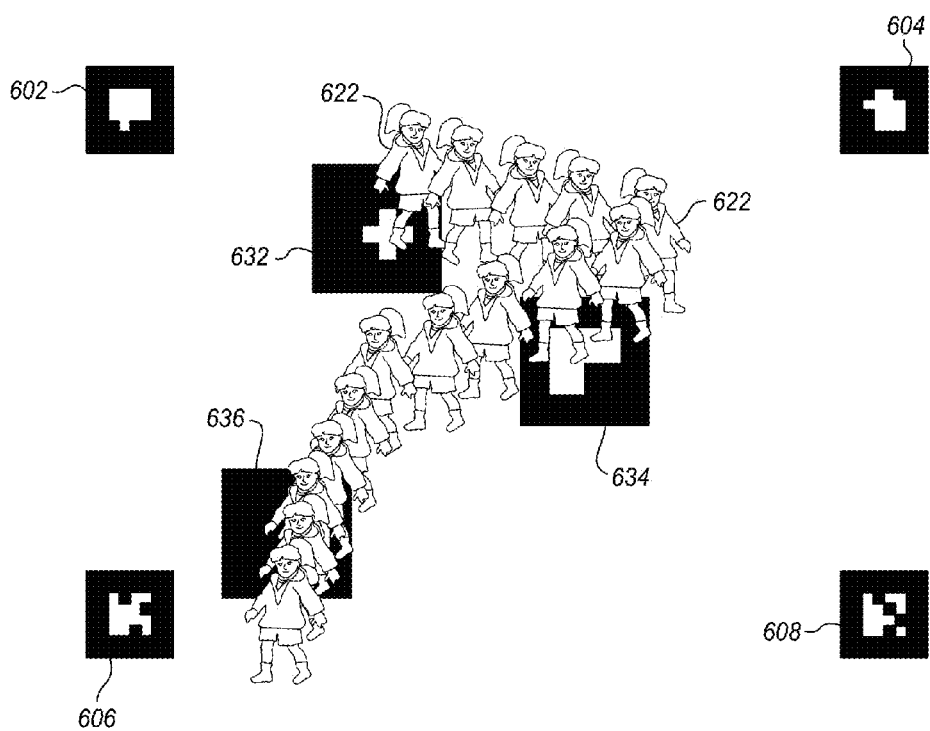
FIG. 6 is a diagram of a video sequence capture with markers according to an embodiment.
Figure 7:
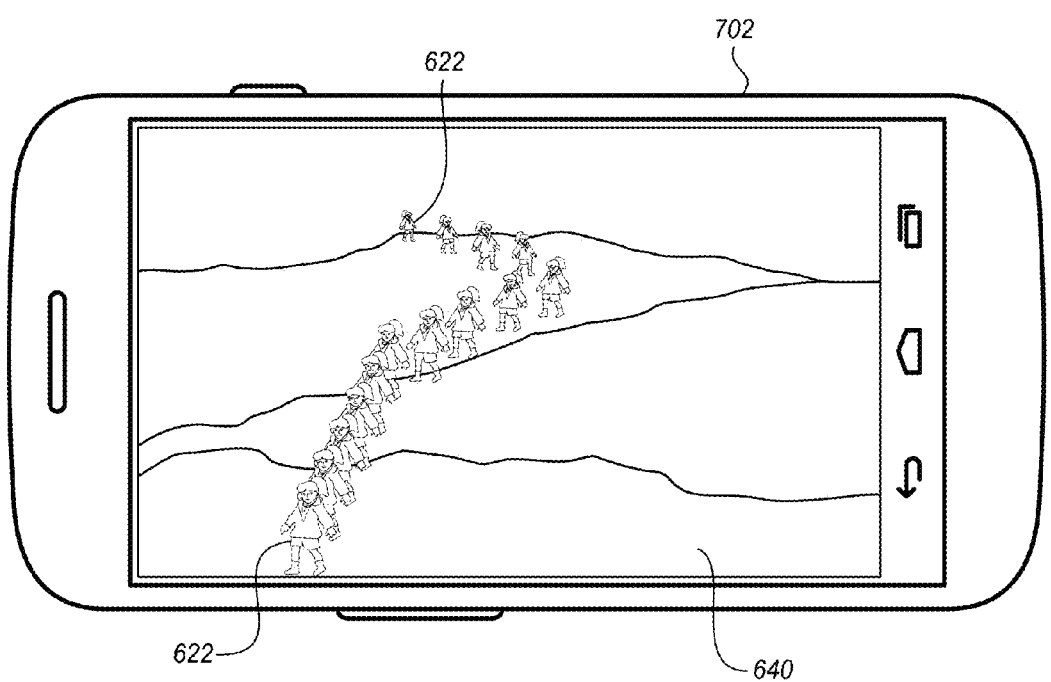
FIG. 7 is a diagram of the application of the video sequence of FIG. 6 to a backdrop using markers according to an embodiment.

Aggregated AR markers may also be used for 3D digital image manipulation of 2D images and 3D models. FIGS. 6 and 7 show how a video sequence of a physical model may be applied to a digital backdrop using markers. FIG. 6 is a diagram of a sequence of superimposed images of a physical model. The diagram is intended to show a video sequence in which each of the superimposed images corresponds to a different frame of the video. The actual video sequence will also include frames in between the images that are shown. In this case, the physical model is a doll in hiking boots, however, any other model may be used whether models of characters, equipment, or natural objects. The doll is placed in a reference field that is bounded by corner markers 602, 604, 606, 608. Each corner marker has a pixel pattern identification and can be associated with a parameter to identify the respective corner. These markers may then be correlated with the corners of a digital backdrop as shown in FIG. 7. The doll 622 is moved within the field identified by the corners. As shown, the movement of the doll traverses a path defined by three additional path markers. One marker 632 is placed at the start of the path. Another marker 634 is placed where the path takes a turn and a third marker 636 is placed at the end of the path.

The sequence of images of the doll 622 may be generated in a variety of different ways. The markers may be placed on a table in view of a stationary camera. The camera may be placed on a stand or a nearby table or shelf where it has a view of the table. The user may then move the doll 622 between the path markers, from the start marker 632 to the turn marker 634 and then to the finish marker 636. The movement of the doll may be captured as a video sequence as the doll is moved by the user or the movement may be captured as a stop motion or stop frame animation or in any other desired way. In FIG. 6, multiple positions of the doll are shown simultaneously to indicate how stages of the video sequence may appear from start to finish.

The user may place the markers on the table and use these markers to guide the movement of the doll. On the other hand, the system may observe the movement of the doll and then generate the path markers 632, 634, 636 based on the actual observed path. The final video may be edited or manipulated by the user using a variety of other tools. In addition, the user may add metadata to the markers after the video is captured and the path markers are established.

As the doll or any other desired subject moves across the selected scene, the system may perform some object, hand, or motion detection to understand the trajectory of the doll. The system may then interpolate the doll across the scene for video rendering. The system may then scale the doll in the rendering to correspond to a scale provided by marker metadata. FIG. 7 depicts the scaling being applied to an otherwise flat image as a backdrop. The scaling is done using depth values created by the marker locations. The depth markers allow depth to be recreated as lost metadata for application to an image that does not already have depth data.

FIG. 7 shows how the video sequence of the doll 622 of FIG. 6 may appear when superimposed over a backdrop scene 640. The superposition is displayed on a screen of a portable device 702 such as a device of the type shown as 202 shown in FIG. 2, however, any other display may be used. The superposition may be rendered by the device or received from an external device. The backdrop may be an image taken by the device or retrieved from storage or an external source. As shown in FIG. 6, the video scene has corner markers 602, 604, 606, 608 for the corners of the field and path markers 632, 634, 636 for the path of the subject of the video. These markers may be used to position the video sequence over the backdrop scene 640. The markers may include parameters that include the height and distance of the various locations used in creating the video sequence.

Using the technique described above and positional metadata from the markers, such as distance or depth, elevation, positional coordinates, etc., the doll 622, or any other model, may be scaled at each marker as the user moves the model across the physical markers. The system may then interpolate a scale between the markers so that the model is scaled gradually as it moves in the video from one marker to the next. The markers may also induce augmented effects in other modalities beyond visual. Such non-visual effects may include background music, dialog, smells, and vibrations. Any of a variety of different AR actuators for these modalities may be used. The associated non-visual effect may be produced by an actuator in response to a user interacting with the location corresponding to the marker. The interaction may be by the user, an augmented reality object, or a video character, touching, selecting, or otherwise interacting with the location. The interaction may also be in the real scene upon which the image is based. In such a case, the interaction may be observed by a camera or other position sensor.

In one example, the video is formed of a sequence of frames and each frame has a time or time stamp. The turn markers in the video may be associated with a frame of the video. The corresponding path markers may be linked to the frame time. In order to apply the video to the scene, the system aligns the video so that the subject, in this case the doll, arrives at the indicated location in the image at the indicated time frame. After the turn markers of the video are aligned with each of the path markers, then the video may be scaled so that the subject hits the markers at each location in the scene. Alternatively, the path markers may indicate physical boundaries of positions of the video and then the video may be scaled so that these positions in the video sequence align with the path markers in the scene.

Figure 8:
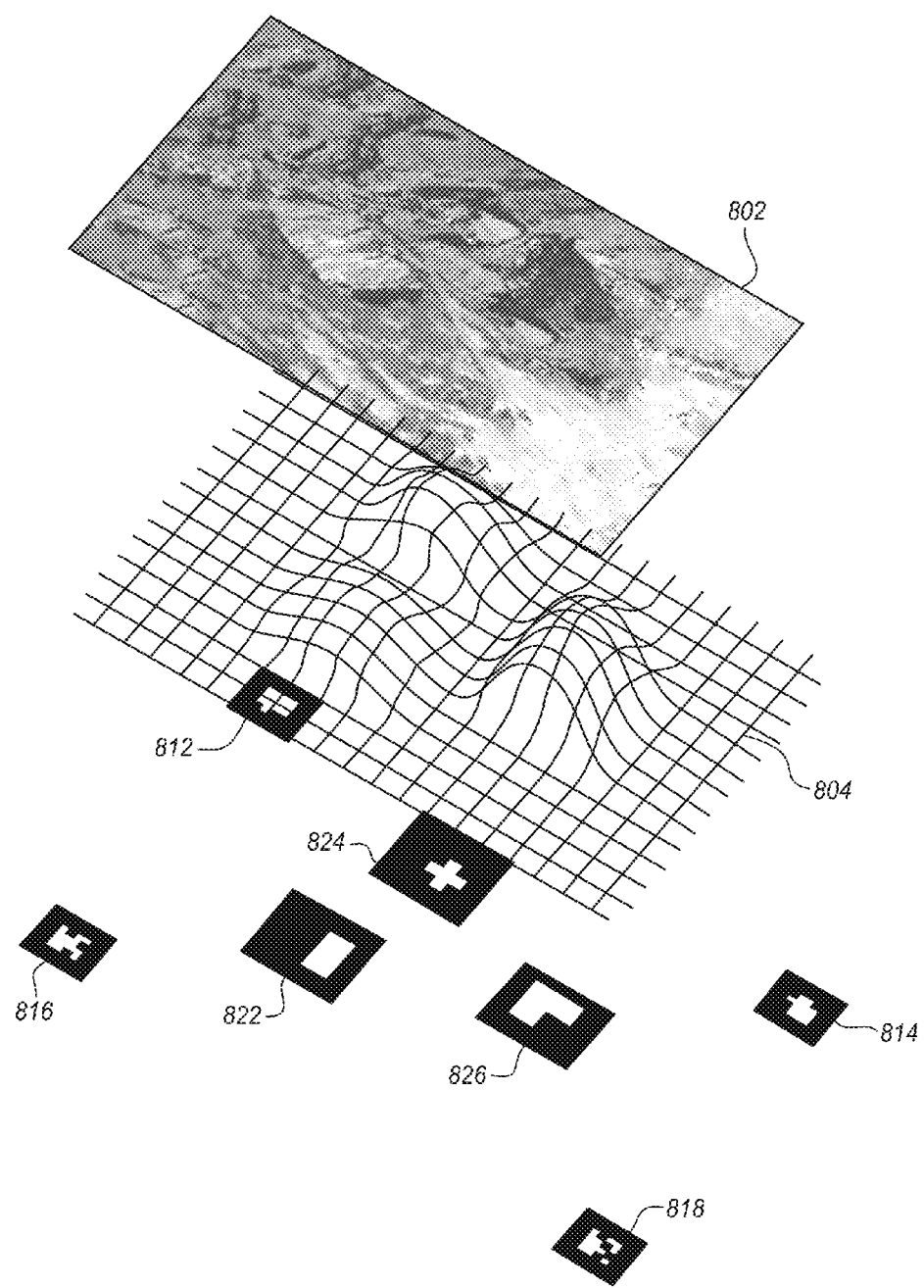
FIG. 8 is an exploded axonometric projection diagram of applying markers as reference points in a parametric model according to an embodiment.

FIG. 8 is an exploded axonometric projection diagram to show how AR markers may be used as reference points in a parametric 3D model. In this example, a first set of markers 812, 814, 816, 818 define the boundaries of the projection and serve as border control points. A second set of markers 822, 824, 826 serve as control points or areas for a height map of a model surface 804. A 2D backdrop image 802 is applied as a texture to the model 804. Each height marker has an associated user defined height. This height may be used as in FIG. 7 so that a subject moving across the markers is automatically scaled to the marker points and to the model.

The markers each have a unique pixel pattern that is observable by a camera. The pattern may then be applied to a table, register, look-up or other memory or storage structure to find the parameters associated with the marker. The pattern may be read directly or translated through a decoding system. The resultant parameter may be the decoded pattern, or the decoded pattern may be applied to a memory or storage, either local or remote to retrieve the parameter or parameters from memory. Alternatively in this or any of the other examples, the parameter may be printed on the marker as text, numerical code, bar code, quick response (QR) or in another way. The markers may be placed in a real location to define the 3D model. A 2D scene may then be selected and adapted based on the markers.

In another example, the markers may be placed on a real surface such a table or field. The user may then move the model within the boundaries defined by the markers and record a video sequence of the movement. The user may then select a backdrop such as the 2D image 802 of FIG. 8 or 640 of FIG. 7. The video may then be rendered by the system over the backdrop using the markers. The user may position markers corresponding to the markers in the video to specific positions on the backdrop or the 2D model 804. This may be done by placing physical markers on an image and then capturing the combination with a camera or virtual markers may be placed on specifically selected locations on a display of the 2D image. The system may then scale and shape the video to adapt the marker positions in the video to conform to the marker positions on the backdrop.

As shown, the user is not required to find an ideal camera position and perspective by moving the camera. The user may set the camera in one position with one perspective and then adjust the scene or model to the physical orientation of the subjects being filmed. Fiducial markers that invoke 3D models may be combined with AR markers to indicate relative heights and positions. These techniques and structures are useful for video creation and editing and for 2D and 3D image or model manipulation.

Figure 9:
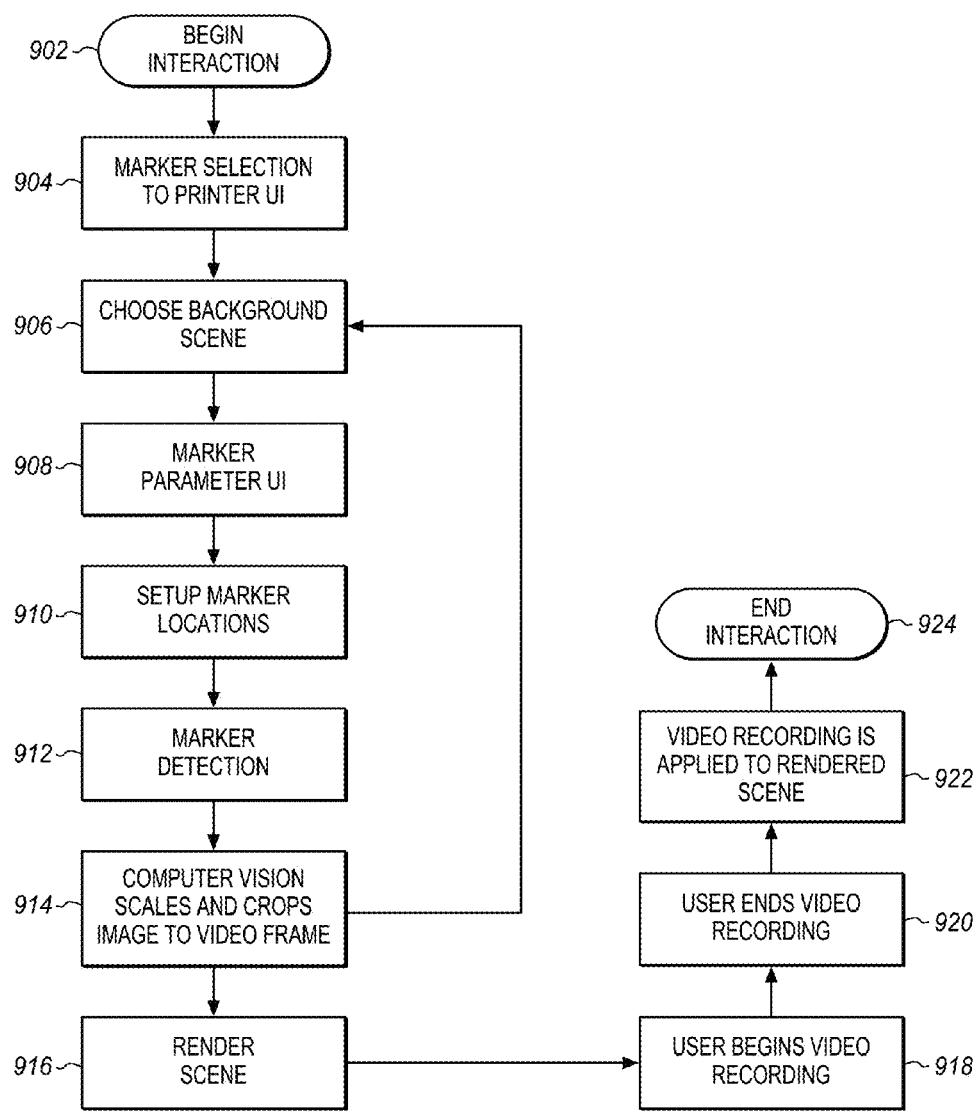
FIG. 9 is a process flow diagram of a scene image manipulation using markers according to an embodiment.

The techniques described herein may be applied to any computing system and 2D or 3D camera. The computing system provides an AR rendering subsystem that works with AR fiducial markers. The AR fiducial markers are augmented with corresponding characteristics such as topographical features, distance, texture, etc. An AR elements coordination module of the computing system matches fiducial markers to the corresponding marker characteristics and feeds the AR rending subsystem with instructions to allow the desired rendering FIG. 9 is a process flow diagram of interaction with a system to manipulate a 2D image using AR markers. The interaction starts at 902 and then markers are selected at 904. The selected markers may be printed for use in a real scene. The markers may be printed on paper or a 3D printer may be used to create a unique model. Alternatively, a pre-existing physical object may be selected as a marker and placed on the scene, such as the doll of FIG. 6. The doll may have a backpack, a hiking stick, a cart, or a companion doll. These may be used as markers on the screen in the same way that the printed images are used as shown. Alternatively, virtual markers may be used that are not physically printed but are placed on a displayed image of a scene through a user interface. At 906, the user selects a background scene over which the markers are to be placed.

At 908, the markers are associated with parameters. There may be a specific portion of a user interface (UI) to support the definition of the parameters for each marker. Similarly there may be a specific printer UI that provides for the operation of associating parameters together with selecting markers at 904. The parameter UI allows the user to define one or more different characteristics to be associated with each marker. These parameters may include height and depth as mentioned. They may also include path or image boundaries, directions, or particular virtual objects that are to be produced at the location of the marker.

With the markers and marker parameters defined, the markers are then placed on a real scene at 910. This scene may a natural or artificial landscape or it may be an image. The scene has then been made ready for capture. At 912 the system camera or a connected camera captures the scene with one or more images. The system may then detect the markers and identify the markers using codes on the markers or image recognition systems for markers that do not have readable codes.

At 914 the system scales and crops the image to a video frame. This may be done in a computer vision system or subsystem or in any other desired rendering system. The scaling and cropping may be repeated as each background scene is selected. After a first scaling and cropping, the system may return to block 906 to repeat the process until the user is satisfied. The user may change the marker locations, the marker parameters, the background scene or any other characteristic. If something is changed, then the system returns to try different background scenes at 906. This is followed by marker parameter definition 908, maker location setup 910, and marker detection 912. The new scene may also be cropped and scaled. The repetitions may continue for as many changes as the user may desire until the user is satisfied.

After the adjustments and modifications indicated by the markers are performed on the captured scene, the system may then render the scene at 916 for display, print, storage etc. One example of such a scene is shown in FIG. 1. Another example of such a scene is shown in FIG. 7. Another example of such a scene before it is rendered is shown in FIG. 8.

The rendered scene may be augmented by adding a video sequence to be superimposed or even blended with the scene depending on the markers. At 918 a user begins a video recording and at 920 the video recording is finished. The video recording is then applied to the rendered scene at 922 as represented for example in FIG. 7. The interaction then ends at 924. The video may be stored for later viewing or for further editing, depending on the particular implementation.

Figure 10:
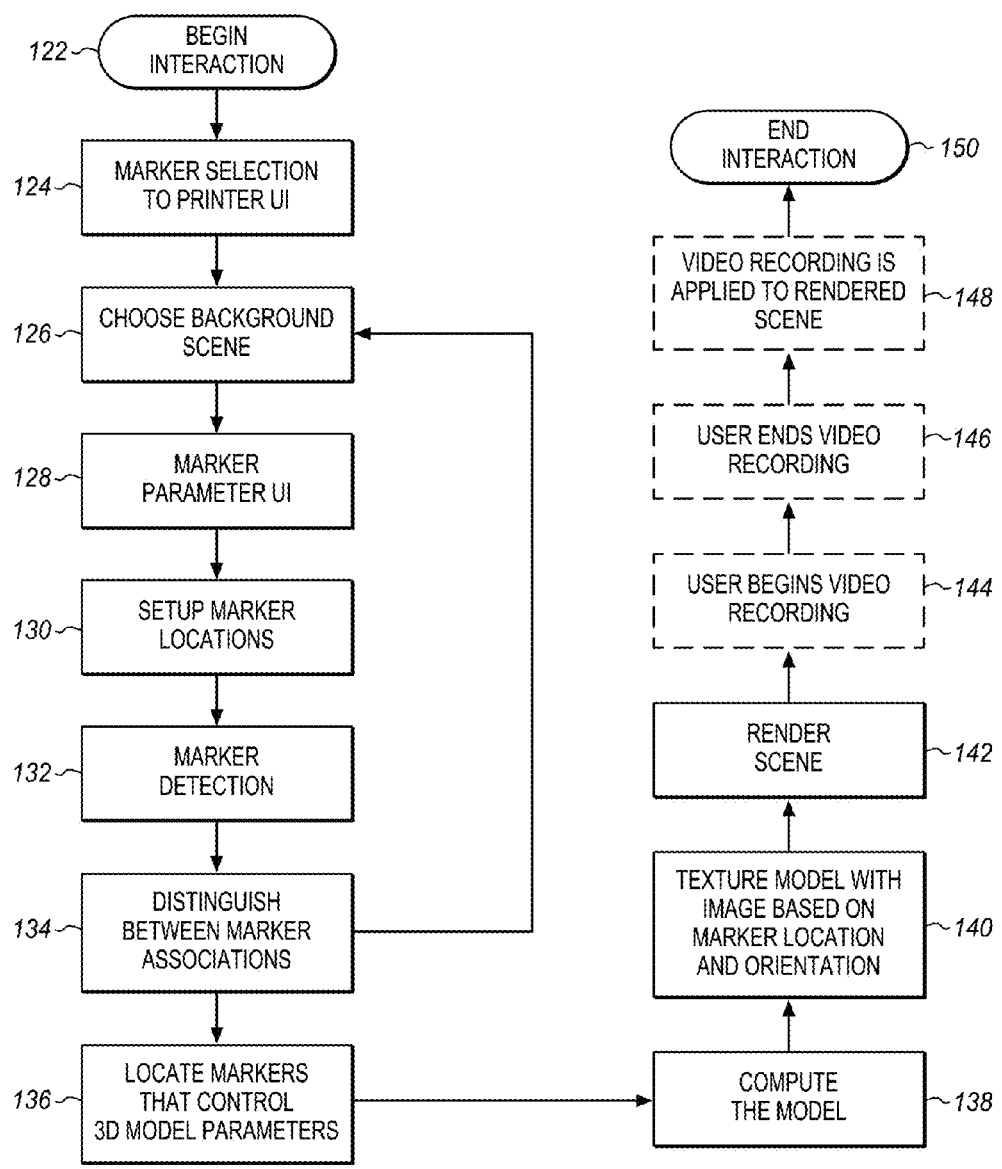
FIG. 10 is a process flow diagram of another scene image manipulation using markers according to an embodiment.

FIG. 10 is a process flow diagram of an interaction for texture mapping a parametric 3D model using AR markers. The interaction begins at 122 and then markers are selected at 124. The markers may be selected from within a printer UI or from any other interface. Alternatively physical objects may be selected and then identified to the system as markers. At 126 a background scene is selected and at 128 parameters are defined for the markers. This may be done using a parameter UI or using any other desired process.

At 130, the markers are set up in location on the scene of operation 126. The markers are then detected in their respective positions at 132 and at 134 the marker associations are determined and distinguished for each marker. If the user is not satisfied or if the user would like to try variations, then the system loops back to 126 for a new background scene and new marker locations or parameters.

At 136 the markers on the scene that control 3D model parameters are located on the scene. At 138 a model is computed using the 3D model parameters and the positions of the markers on the scene. The model is then textured using the background scene. The position and orientation of each marker is used together to apply the texture to the 3D model. The scene may then be rendered at 142. The scene may also be saved for use later.

A video or other feature may then optionally be added to the rendered scene. As in the example of FIG. 9, the user may record a video at 144 and then continue until all of the video details are completed at 146. This video is then added to the textured rendered scene at 148. This may be done by superposition, by blending or by using other techniques depending on the nature of the video and the scene. Additional videos may be added in the same way to add additional complexity to the final result.

Figure 11:
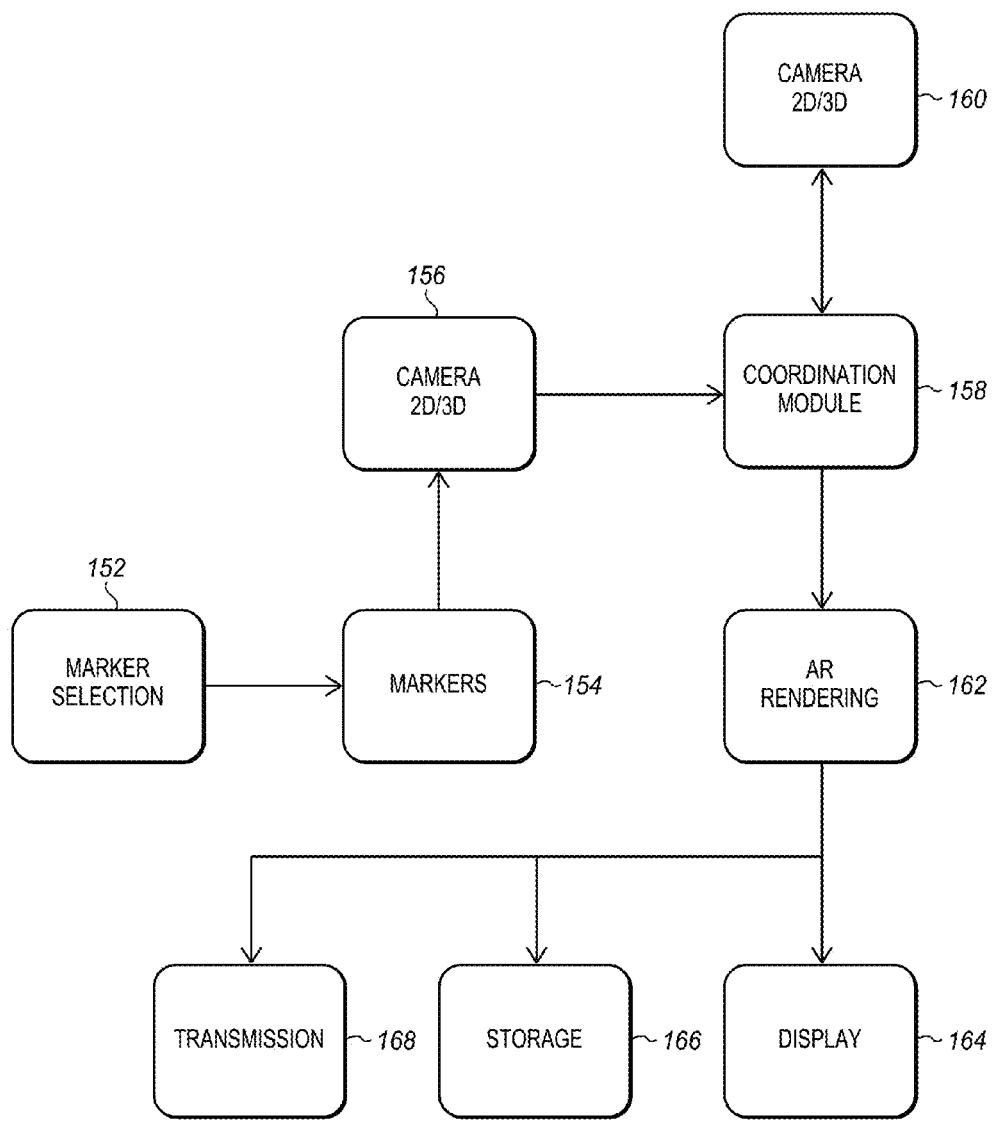
FIG. 11 is a hybrid system and process block diagram of a computing system for augmented reality operation according to an embodiment.

FIG. 11 is a hybrid system and process block diagram. At 152 the printer UI coordinates with the marker selection UI to cause the production or identification of markers at 154. The markers, after being placed in a scene, are captured by a camera system 156 which may be a 2D or a 3D camera system. The camera capture data is provided to a coordination module 158 of the system. This module also receives other image data from the same or a different camera capture system 160 or from memory. The coordination module combines the captured marker data from the first camera system 160 and the captured image or video data, if any, from the second camera system 160 which may be the same camera system or another system. After the data is coordinated, then it is passed to AR rendering 162 and is then provided on a display 164. It may also be passed to storage 166 and transmission 168, depending on the preferred use of the AR rendering.

Figure 12:
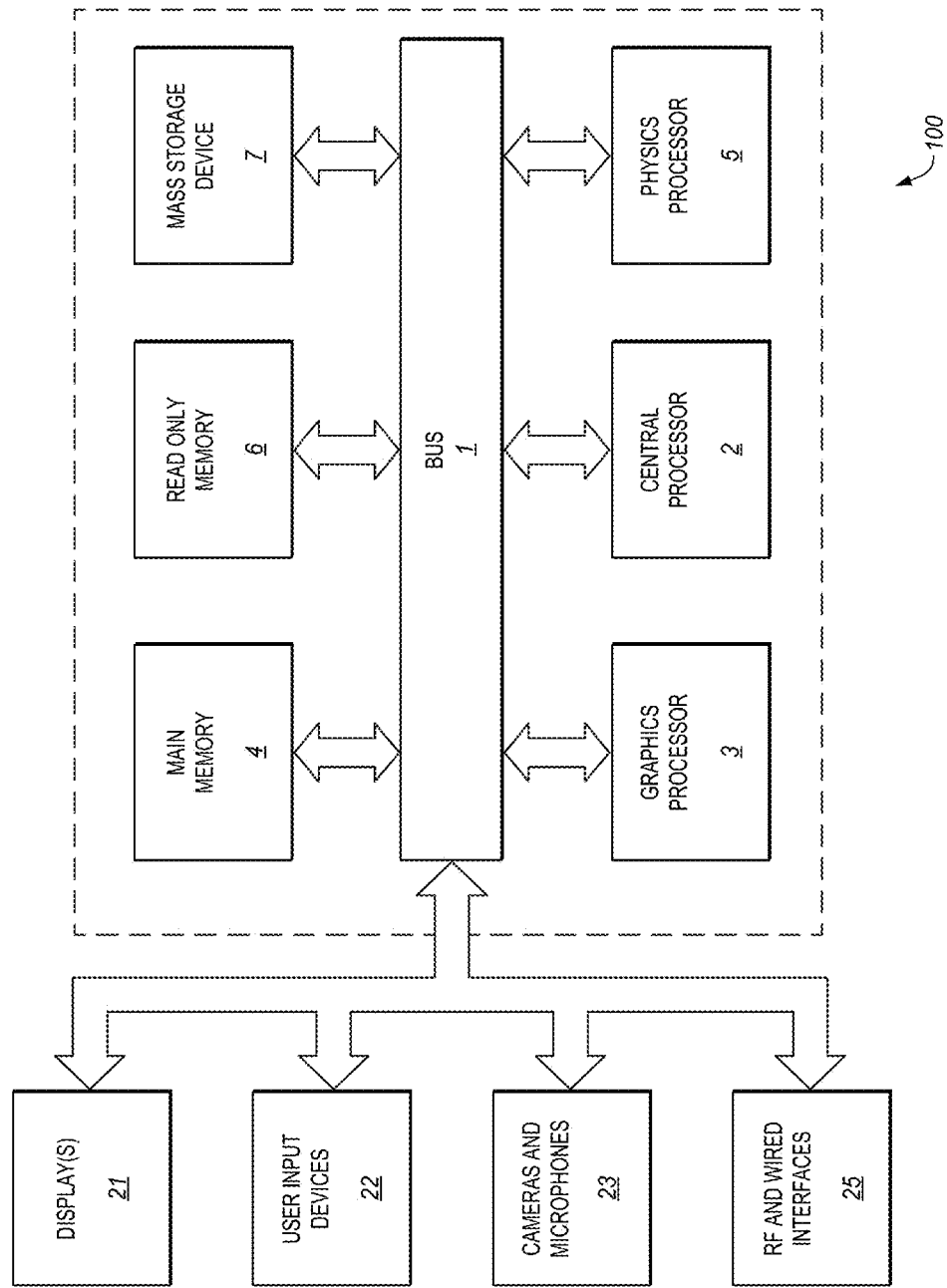
FIG. 12 is a block diagram of a computing system for augmented reality operation according to an embodiment.

FIG. 12 is a block diagram of a computing system 100 suitable for use as the AR device described above, such as a personal computer, tablet or slate computer, gaming console, smartphone or portable gaming device. Alternatively, the AR device 100 may be a media system although the system is not limited to this context. For example, the system may be incorporated into a personal computer (PC), laptop computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth including wearable devices.

The AR device computer system 100 includes a bus or other communication means 1 for communicating information, and a processing means such as a microprocessor 2 coupled with the bus 1 for processing information. The computer system may be augmented with a graphics processor 3 specifically for rendering graphics through parallel pipelines and an imaging or physics processor 5 or other specialized processor for analyzing images and interactions between video and images as described above. These processors may be incorporated into the central processor 2 or provided as one or more separate processors.

The computer system 100 further includes a main memory 4, such as a random access memory (RAM) or other dynamic data storage device, coupled to the bus 1 for storing information and instructions to be executed by the processor 2. The main memory also may be used for storing temporary variables or other intermediate information during execution of instructions by the processor. The computer system may also include a nonvolatile memory 6, such as a read only memory (ROM) or other static data storage device coupled to the bus for storing static information and instructions for the processor.

A mass memory 7 such as a magnetic disk, optical disc, or solid state array and its corresponding drive may also be coupled to the bus of the computer system for storing information and instructions. The computer system may also be coupled via the bus to a display device or monitor 21, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices 22, such as a keyboard with alphanumeric, function and other keys may be coupled to the bus for communicating information and command selections to the processor. Additional user input devices may include a cursor control input device such as a mouse, a trackball, a trackpad, touchscreen sensor, or cursor direction keys can be coupled to the bus for communicating direction information and command selections to the processor and to control cursor movement on the display 21.

Camera and microphone arrays 23 are coupled to the bus to capture scenes, record audio and video and to discern markers as mentioned above.

Communications interfaces 25 are also coupled to the bus 1. The communication interfaces may include a modem, a network interface card, or other well-known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, control surfaces or consoles, or servers via a conventional network infrastructure, including an Intranet or the Internet, for example.

A lesser or more equipped system than the example described above may be preferred for certain implementations. Therefore, the configuration of the exemplary systems will vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes capturing a scene by a camera, the scene having a marker, analyzing the captured scene to identify the marker, determining a location of the marker in the captured scene, determining an augmented reality parameter associated with the identified marker, modifying the captured scene at the marker location based on the augmented reality parameter, and rendering the modified scene.

In further embodiments the captured scene has a texture.

In further embodiments the augmented reality parameter is an elevation and modifying comprises applying the elevation to the captured scene at the marker location.

In further embodiments the parameter is a boundary and modifying comprises applying a video sequence to the captured scene and positioning and scaling the video so that the video is within a boundary as determined by the location of the marker in the captured scene.

In further embodiments the parameter is a boundary of the captured scene and modifying comprises scaling the captured scene to move a three-dimensional position of the captured scene at the marker location.

In further embodiments moving a three dimensional position comprises moving an edge of the captured scene closer to a viewing position in a 3D space.

Further embodiments include cropping the captured scene after moving the captured scene in the 3D space.

Some embodiments pertain to a method that includes associating a parameter with a fiducial marker, applying the fiducial marker to a location in an image of a scene, and modifying the image to apply the parameter to the image.

In further embodiments applying a marker comprises placing a marker at a location in a real scene, the real scene corresponding to the scene of the image.

In further embodiments applying the parameter comprises applying an elevation to a feature of the image, the feature being at the location of the fiducial marker.

In further embodiments applying the parameter comprises applying a depth to a feature of the image, the feature at the location of the fiducial marker.

In further embodiments applying the parameter comprises applying a non-visual augmented reality effect to the location of the fiducial marker.

In further embodiments modifying the image comprises applying a video to the image.

In further embodiments applying a video comprises superimposing a video over the image.

In further embodiments the marker parameter is a time frame of a video sequence and applying a video comprises aligning a subject of the video sequence at the time frame with the location in the image.

Some embodiments pertain to a machine-readable medium having instructions that when operated on by the machine cause the machine to perform operations that include associating a parameter with a fiducial marker, applying the fiducial marker to a location in an image of a scene, and modifying the image to apply the parameter to the image.

In further embodiments modifying the image comprises placing a virtual object in the scene at the location of the fiducial marker, the parameter identifying the virtual object, the operations further comprising scaling the virtual object using depth information of the image.

Some embodiments pertain to an apparatus that includes a memory to store an image of a scene captured by a camera, the scene having a fiducial marker applied to a location in the image, and the memory to store a parameter associated with the fiducial marker, and a processor having a rendering module to identify the fiducial marker, to retrieve the stored parameter, and to modify the image to apply the retrieved parameter to the image.

In further embodiments the memory further stores a second image of a scene captured by a second camera and the processor further comprises a coordination module to combine the first and the second images before being modified by the rendering module.

In further embodiments the second image is part of a video sequence and the coordination module applies the video sequence to the first image using the first image as a backdrop.

What is claimed is:

1. A method of modifying an image comprising:
   capturing an image of a scene by a camera, the scene having a surface and one or more physical markers on the surface;
   analyzing the captured scene to identify the physical marker;
   determining a location of the physical marker in the captured image;
   reading an observable pattern on the physical marker;
   using the read pattern to determine an augmented reality parameter associated with the pattern on the identified physical marker, wherein the parameter modifies an appearance of the surface;

modifying the image of the surface at the physical marker location based on the augmented reality parameter, further comprising modifying the image by superimposing a video over the image, wherein the scene has a video frame marker, wherein a parameter associated with the video frame marker is a time frame of a video sequence, and wherein superimposing the video over the image comprises aligning a subject of the video sequence at the time frame of the parameter with a location of the video frame marker in the captured image; and rendering the modified image.

2. The method of claim 1, wherein the augmented reality parameter indicates at least one of a texture, color and topography, and wherein modifying comprises applying the respective texture, color, or topography to the surface.

3. The method of claim 1, wherein the augmented reality parameter is an elevation and wherein modifying comprises applying the elevation to the image of the surface at the physical marker location.

4. The method of claim 1, wherein the scene has a plurality of boundary markers, the method further comprising:
   identifying the boundary markers;
   reading respective observable patterns on the boundary markers;
   using the read boundary marker patterns to determine that the boundary markers identify boundary locations; and
   wherein modifying comprises applying a video sequence to the image, and positioning and scaling the video sequence so that the video is within a boundary as determined by the locations of the boundary markers.

5. The method of claim 1, wherein the surface is a printed two-dimensional image, wherein the augmented reality parameter is a three-dimensional topography of the image and wherein modifying further comprises applying three-dimensional topography to the two-dimensional printed image surface in the image at the physical marker location.

6. The method of claim 5, wherein moving a three dimensional position comprises moving an edge of the image closer to a viewing position in a 3D space.

7. The method of claim 5, further comprising cropping the image after moving the captured scene in the 3D space.

8. The method of claim 1 wherein the scene has a further effect marker, the method comprising:
   identifying the effect marker;
   reading an observable pattern on the effect marker;
   using the read effect marker pattern to determine that the parameter associated with the effect marker comprises a non-visual augmented reality effect, and wherein modifying comprises applying the effect to the image at the location of the effect marker.

9. The method of claim 1, wherein the augmented reality parameter is a texture and wherein modifying further comprises applying the texture to the entire surface in the image.

10. The method of claim 1, wherein the scene further has path markers, the method comprising:
    analyzing the captured scene to identify the path markers;
    determining locations of the path markers in the captured image;
    generating a sequence of images to show a character traversing a path in the scene defined by the path markers.

11. The method of claim 1, wherein the surface is a table, wherein the parameters associated with the patterns on the physical markers modify elevations and textures of the appearance of the image of the surface, the scene further having path markers.

12. The method of claim 1 wherein the pattern is a printed quick response code.

13. The method of claim 1, wherein the pattern is an appearance of a doll.

14. An apparatus comprising:
    a memory to store an image of a scene captured by a camera, the scene having a surface and one or more physical markers on the surface, each physical marker having an observable pattern, and the memory to store a parameter associated with each of the observable patterns, wherein the parameter modifies an appearance of the surface; and
    a processor having a rendering module to identify the physical marker in the image, to read the respective observable pattern on the marker, to retrieve the stored parameter associated with the pattern, and to modify the image of the surface based on the retrieved parameter, further comprising the processor to modify the image by superimposing a video over the image, wherein the scene has a video frame marker, wherein a parameter associated with the video frame marker is a time frame of a video sequence, and wherein superimposing the video over the image comprises the processor aligning a subject of the video sequence at the time frame of the parameter with a location of the video frame marker in the captured image.

15. The apparatus of claim 14, wherein the memory further stores a second image of a scene captured by a second camera and wherein the processor further comprises a coordination module to combine the first and the second images before being modified by the rendering module.

16. The apparatus of claim 15, wherein the second image is part of a video sequence and wherein the coordination module applies the video sequence to the first image using the first image as a backdrop.

17. A non-transitory machine-readable medium having instructions that when operated on by the machine cause the machine to perform operations comprising:
    capturing an image of a scene by a camera, the scene having a surface and one or more physical markers on the surface;
    analyzing the captured scene to identify the physical marker;
    determining a location of the physical marker in the captured image;
    reading an observable pattern on the physical marker;
    using the read pattern to determine an augmented reality parameter associated with the pattern on the identified physical marker, wherein the parameter modifies an appearance of the surface;
    modifying the image of the surface at the physical marker location based on the augmented reality parameter, further comprising modifying the image by superimposing a video over the image, wherein the scene has a video frame marker, wherein a parameter associated with the video frame marker is a time frame of a video sequence, and wherein superimposing the video over the image comprises aligning a subject of the video sequence at the time frame of the parameter with a location of the video frame marker in the captured image; and
    rendering the modified image.

* * * * *